United States Patent
Bright

(10) Patent No.: US 8,080,902 B2
(45) Date of Patent: Dec. 20, 2011

(54) ELECTRICAL GENERATION PROTECTION SYSTEM

(75) Inventor: Christopher Graham Bright, West Bridgford (GB)

(73) Assignee: Rolls-Royce PLC, London (GB)

( * ) Notice: Subject to any disclaimer, the term of this patent is extended or adjusted under 35 U.S.C. 154(b) by 601 days.

(21) Appl. No.: 12/226,863

(22) PCT Filed: May 2, 2007

(86) PCT No.: PCT/GB2007/001601
§ 371 (c)(1),
(2), (4) Date: Dec. 30, 2008

(87) PCT Pub. No.: WO2007/132157
PCT Pub. Date: Nov. 22, 2007

(65) Prior Publication Data
US 2009/0160260 A1    Jun. 25, 2009

(30) Foreign Application Priority Data

May 4, 2006   (GB) .................................. 0608773.8

(51) Int. Cl.
*H02J 1/00*   (2006.01)
(52) U.S. Cl. .......................................... 307/85; 307/87
(58) Field of Classification Search .................. 307/85, 307/87
See application file for complete search history.

(56) References Cited

FOREIGN PATENT DOCUMENTS
EP    0 677 911 A1    10/1995

OTHER PUBLICATIONS

Jang et al., "An Islanding Detection Method for Distributed Generations Using Voltage Unbalance and Total Harmonic Distortion of Current," *IEEE Transactions of Power Delivery*, vol. 19, No. 2, Apr. 2004, pp. 745-752.

Schultz et al., "Islanding Detection in Germany: Current Standards and Development," *17th European Photovoltaic Solar Energy Conference*, Munich, Germany, Oct. 22-26, 2001, pp. 520-523.

*Primary Examiner* — Robert L. Deberadinis
(74) *Attorney, Agent, or Firm* — Oliff & Berridge, PLC

(57) ABSTRACT

Distributed generation systems incorporate a distribution network and typically a number of distributed generators. It is possible that power islands may be created in substations incorporating a generator when that substation and generator is isolated from the distribution network by a circuit breaker. A problem arises when the power island is re-connected to the distribution network when the phase of electrical power supply in the previous power island is not synchronized with the power supply on the distribution network. Identifying such an out of phase nature is achieved utilizing application of test reactances, both capacitative and inductive, across the whole distribution network such that such test reactances are substantially unbalanced within a particular substation and in particular a distribution path for a generator so that there is a test reactance load imbalance which will identify out of phase operation and therefore control activation of the circuit breaker.

23 Claims, 2 Drawing Sheets

ELECTRICAL GENERATION PROTECTION SYSTEM

The present invention relates to electrical generation protection systems and more particularly to a distributed generation system for electrical power generation comprising a number of electrical generators coupled to an electrical distribution system.

Distributed generation is electricity generation that connects to the electricity distribution system rather than the electricity transmission system. Distributed generators are typically less than 50 MW and connected to electricity distribution systems with voltages less than 100 kV. Such distributed generation systems allow use of diffused generating sources such as from renewable energy or excess capacity from a local user generator.

Distributed generation differs in many ways from the main common centralised large power station connected to a transmission system. In particular the infrastructure which can be justified with large scale power station and transmission systems generally cannot necessarily be justified, for distributed generation systems so that such systems cannot enjoy fast acting and comprehensive protection mechanisms.

One risk associated with distributed generation is unintentional islanding also referred to as loss-of-mains. Islanding occurs when one or more distributed generators become disconnected from the electricity distribution system of a host utility system to form a so-called power island in which the generator supplies local demand only.

Figure 1:
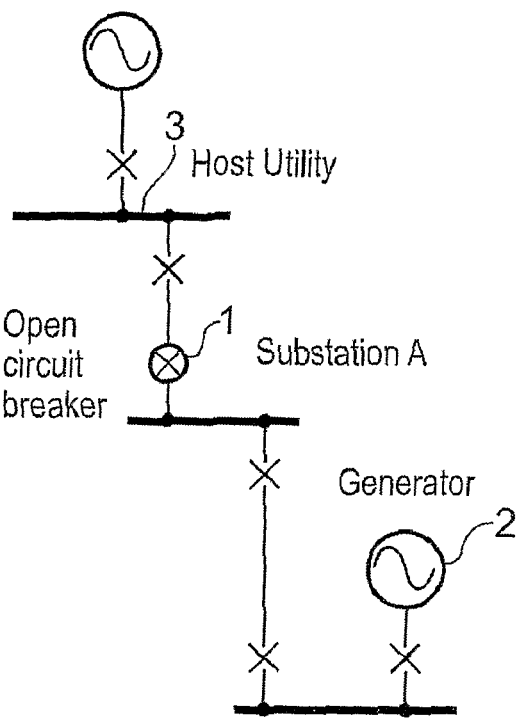

FIG. 1 of the associated drawings illustrates a known prior power island situation. If a circuit breaker 1 at a substation A opens due to a fault or otherwise a generator 2 is isolated from a host utility distribution system 3.

The generator 2 continues to energise and provide power to the substation A. The generator 2 and substation A form a power island. If the electrical power generated by the generator 2 more or less matches any load presented within the power island, referred to as the island load, then the power island comprising the generator 2 and substation A may continue to operate with the generator 2 meeting the island demand at a voltage and frequency which remains within specified limits. However, it will be appreciated that the power island is essentially isolated such that there are several dangers. The most immediate danger is a situation where there is re-closure, that is to say the circuit breaker 1, acts to reconnect the substation 1 to the utility distribution network 3 but out-of-phase. In such circumstances, the host utility distribution system may attempt to reconnect the power island, that is to say the generator 2 and the substation A with the rest of the system or network 3 with the voltages of the two systems 3 and the power island out-of-phase. Such mismatching between the host utility distribution system 3 and the power island may cause serious damage to apparatus and other infrastructure.

Figure 2:
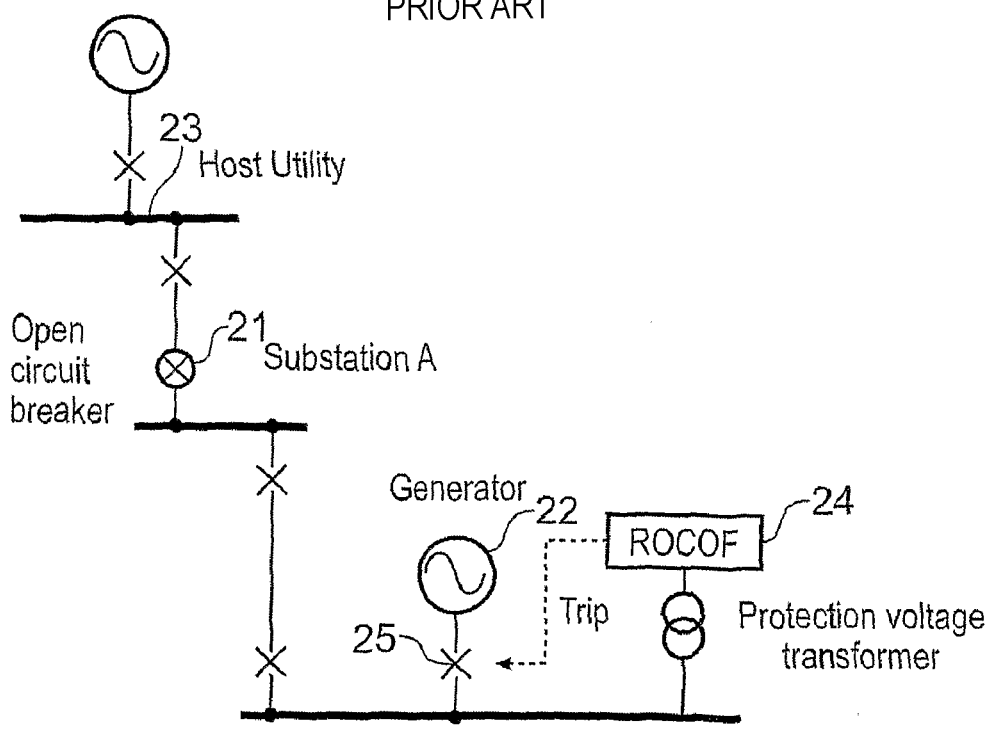

Although relatively expensive check synchronising protection can provide a full centralised control of power stations and transmission systems, the expense is rarely justified for simple distributed systems. In such circumstances it is common to provide a so-called rate of change of frequency (ROCOF) protection system. ROCOF generator protection measures the rate of change of frequency of the voltage measured at or close to a generator. Islanding that presents a risk of out-of-phase re-closure usually produces a rate-of-change of frequency detectable by a ROCOF relay. FIG. 2 illustrates a typical prior ROCOF generator protection system. The ROCOF generator protection system 24 acts to trip the generator circuit breaker 25 although the ROCOF generator relay may initiate other action instead or in addition to such isolation. In such circumstances as previously a generator 22 provides power to a substation A which is connected to a circuit breaker 21 to a host utility distribution system 23. As previously, the circuit breaker 21 may open and isolate the substation creating a power island as described previously. However, with the ROCOF protection system 24 if there is a risk of out-of-phase re-closure then the generator circuit breaker 25 will isolate the generator 22 and so avoid any potential mismatching of the out-of-phase supply between the temporarily isolated power island including the generator 22 and the phase in the host utility distribution network 23.

A particular problem with ROCOF generator protection systems is that the system cannot discriminate between local changes in frequencies when it should isolate its generator and distribution system or network wide frequency changes for which the ROCOF generator protection should not activate as this is a general uniform or a least acceptable frequency change and therefore an out-of-phase scenario is not present. However, such system wide frequency changes are not uncommon and can be as a result simply of a major power station or other generator going off line for maintenance or otherwise. Unfortunately, the consequence of such system wide frequency changes as indicated may cause any ROCOF generator protection system fitted to the distribution network to operate so aggravating the consequences of loss of a major generator, jeopardising overall system security and capability and generally adding to system unreliability rather than mitigating such unreliability.

In accordance with aspects of the present invention there is provided a generation system comprising a generator and a distribution path to a distribution network the distribution path including a circuit breaker which may isolate the generator, the distribution network having at least one phase of electrical power passing through it in use and a phase discriminator having substantially a balanced load collectively over all phases of electrical power across the distribution network, the phase discriminator acting across phase pairs and including means whereby a test reactance is switched into the phase of the electrical power through the distribution network to identify phase unbalance in the distribution path through an unbalanced test reactance load in the distribution path in order to control the circuit breaker in terms of isolation of the generator from the distribution network.

Typically, the generator provides poly-phase electrical power.

Typically, the poly-phase electrical power is three phase and has two test reactance types, inductive and capacitive.

Typically, two or more phase pairs with inductive and capacitive test reactance will cancel each other across the distribution network to provide the balanced load.

Typically, the phase discriminator acts by switches to provide combinations of phase pairs with test reactance across the network and/or distribution path for load balance.

Typically, each switch may be altered to provide different combinations of phase pairs and/or test reactance.

Typically, the phase discriminator is arranged from time to time to connect the test reactance to the phase pairs for a period of time.

Advantageously, the phase discriminator includes a time delay to prevent determination of the load across the phase discriminator due to simple switching of the phase pairs with test reactance by the phase discriminator.

Typically, the test reactance is applied between different phases in the distribution network.

Advantageously, the phase discriminator is combined with an ROCOF generator protection arrangement. Typically, the phase discriminator is arranged to apply the test reactance across phase pairs in advance of the ROCOF generator protection system.

Also in accordance with aspects of the present invention there is provided a method of phase discrimination in a generation system comprising switching a test reactance across phase pairs of a distribution network such that the phase pairs and the test reactance are substantially balanced in terms of load across the whole distribution network but an un-balanced test reactance load in a particular distribution path to a generator of the generation system will identify unbalance due to islanding in a distribution path and control a circuit breaker in order to isolate the generator from the distribution network.

Typically the phase pairs and the test reactance in two or more phase pairs will be arranged to substantially cancel each other out in terms of load over the distribution network.

Typically, the method incorporates switching combinations of phase pairs with respective test reactance across the network and/or distribution path to identify phase load unbalance. Generally, these switches may be altered to provide different combinations of phase pairs and/or test reactance. Advantageously, the method is arranged to periodically apply test reactance to the phase pairs over a period of time. Additionally, the method incorporates a time delay to prevent determination of unbalance during the connection and disconnection of test reactances.

Aspects of the present invention will now be described by way of example only with reference to the accompanying drawing, FIG. 3.

Figure 3:
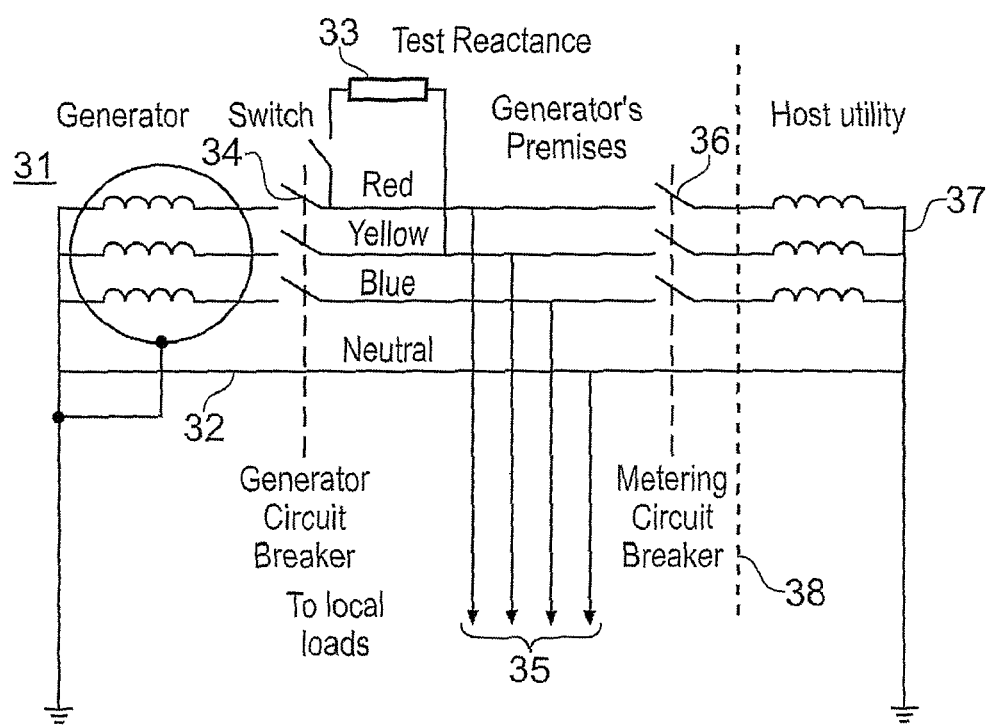

FIG. 3 schematically illustrates application of test reactance across phase pairs within a distribution network in accordance with aspects of the present invention.

As indicated above there are problems with ROCOF generator protection systems. One way of improving the discrimination of ROCOF generator protection system is to combine the measurement of frequency with one or more measurements of other quantities that, in combination, would indicate power islanding with respect to an electrical power generator. A power island differs from the host utility distribution network in a number of ways including the following:— a. Greater and more frequent changes in frequency: The principle behind ROCOF protection.
b. Greater and more frequent changes in voltage: The principle behind over-voltage and under-voltage protection.
c. Worse phase unbalance.
d. Higher system impedance, that is to say lower fault levels.
e. Worse harmonic voltages.

Unfortunately, measurement of one of the above additional features of power islands, either alone or in combination, does not unambiguously indicate the formation of a power island.

In the above circumstances some power island protection methods abandon a purely passive approach based upon measurement alone and instead favour an active approach which deliberately disturbs the distribution system to which distributed generation connects. The principle behind such approaches is that during connection to the host utility distribution network any attempt to disturb the utility system will have much less effect than during operation as a power island. Thus, during connection to the host utility distribution system a disturbance should have little effect in order to avoid interference with other customers on the distribution network. However, there are a number of objections to such more active approaches including:

a. Uncertainty as to how different disturbing methods will interact with each other or other apparatus connected to a distribution network. This is particularly true of measurements made by injecting harmonics since harmonics produced by other equipment may be of a magnitude large enough to defeat power island protection based upon harmonic injection and measurement.
b. Owners of other generators and host utilities may object to deliberate attempts to disturb the system even if such disturbances would be generally undetectable during normal operation.
c. If a larger portion of distributed generators which may become power islands use the same method of disturbance, the disturbances over the whole system would be additive and may present a serious risk to system operation. For example, power island protection could be designed to connect a load following a measurement of a change in frequency. It would be expected that such a connection would have little effect on system voltage and frequency during connection to a host utility, but during operation as a power island voltage and frequency would fall. However, if many distributed generators adopted this method the whole electricity distribution system would be disturbed by sudden application of such loads. This would result in interference with other customers but the consequent voltage and frequency disturbance may cause unintended operation of island protection where not necessary. In such circumstances methods of disturbing the electrical system should have a detectable effect at the point of measurement but no overall effect on the distribution system.

In accordance with the present invention as indicated above, aspects of the present invention provide a method of disturbing an electrical system which will have a detectable effect at the point of measurement yet no overall effect on the whole system. Aspects of the present invention achieve this requirement by using local phase unbalance that is distributed across the phases of an entire electrical distribution system so that the system as a whole is balanced and overall disturbance is minimised. Furthermore, inductive and capacitive unbalance is used so that over the whole distribution network the effects of inductive and capacitive test reactance substantially cancel each other out.

Aspects of the present invention provide for power island identification using the underlying principles of:

a. Following a measurement of a change of frequency, a test reactance is connected between two phases of a three phase electrical power supply in a distribution system to produce a phase un-balance. FIG. 3 illustrates the potential connections which can be provided to achieve the test reactance. Further description of this will be provided below.
b. A negative phase sequence discrimination element measures phase un-balance. The phase un-balance due to the connection of the test reactance previously described will be much greater when the generator is operating as part of a power island than when the generator is synchronised to the host utility distribution network.
c. Phase balancing would prevent a group of generators from causing undue phase unbalance.

Referring to FIG. 3 as can be seen the generator 31 provides three phases respectively identified as red, yellow and blue although other reference identifiers could be used. The generator 31 is earthed and includes a neutral reference 32. The generator 31 is connected to the electrical system by a switch or circuit breaker 39. In the three phase situation described there are three possible combinations of phase pairs which may be utilised, namely red-yellow, yellow-blue and blue-red. For illustration purposes only, a test reactance 33 is illustrated between the red-yellow phase, but it will be understood that switch 34 can be provided in order to place test reactances across other phase pairs. The test reactance 33 may be an inductance or a capacitance, neither of which impose active power demand upon the electrical power distribution network.

As can be seen, normally the phases red, yellow, blue and neutral 32 are coupled through outputs 35 within a substation as well as through circuit breakers 36, 39 to a distribution network 37. In such circumstances all apparatus to the left of broken line 38 can be considered as part of the substation and therefore will generally be on or associated with premises incorporating the generator 31.

For information a particular advantage with using phase un-balance discrimination will often apply in balance test impedances across all three phases such that measurements of phase un-balance is less vulnerable to voltage changes due to switching of loads. Switching of loads tends to produce balanced voltage changes in normal operation.

In view of the above, it will be understood that there are six potential combinations with a three-phase electrical power supply arrangement, that is to say the phase pairs, red-yellow, yellow-blue and blue-red compounded with the two test reactance types, namely inductance and capacitance. For each generator 31 in the distributed generator arrangement it will be understood that there is an assigned one of the six combinations of phase pair and test reactance type. Generally, the assignment of a particular phase pair and test reactance type will be determined by an overall consideration of the distribution network in order to meet desired objectives as outlined below, namely:

a. Over the whole distribution network the connection of test reactances must not cause undue voltage changes or phase unbalance. In practice, this requires a test reactance system to present a reasonably balanced load and that the inductive and capacitive test reactances across any two phase pairs cancel out as far as reasonably practical over the whole distribution network.

b. Any part of the distribution network that is not allowed to operate as a power island has test reactances that present an unbalanced load locally that produces an easily detectable unbalance during islanding using the negative phase sequence processes for such determination.

It will be understood that assignment of combinations of phase pairs and test reactances in accordance with aspects of the present invention will be determined in order to at least approach the above objectives. Generally switching will be provided to allow the desired combinations of phase pairs and test reactances to be applied across the distribution network for investigatory purposes. In such circumstances, either a static assignment of combinations of phase pairs and test reactances will be determined upon initial distribution network set up, or more conveniently monitoring of the distribution network will occur in order to achieve necessary reassignment of combinations through appropriate switching, links or otherwise in order to achieve or approach the above desired objectives in view of variations in the distribution system such as scheduled outages of a particular local generator or variation in load demands at different nodes within the distribution network.

Phase balance across the whole distribution network will require ROCOF relays and associated switch gear to switch the test reactances into and out of operation at the same time. In turn, this will require the ROCOF relays to have the same settings and similar characteristics. Inevitably, there will be some variation in switching times and so there will be brief periods of unbalance. These periods will not tend to last longer than 100 milli seconds and will be of little significance with regard to operation of the distribution network as perceived by users.

With respect to the negative phase sequence (NPS) discrimination feature, there will be a time delay to prevent operational response to short brief unbalances due to the switching of test reactance's etc. NPS measurement is a known technique and described in a variety of protection systems. Such active phase sequence discrimination may be based upon voltage measurements, in which case, voltages at or close to the generator will be measured or alternatively the negative phase sequence measurement may be based upon electrical current, for example when the test reactance is connected during power islanding most, if not all, of the electrical current taken by the test reactance will be supplied by the generator. If the test reactance is connected when the generator is synchronised to the host utility only some of the electrical current taken by the test reactance will be supplied by the generator, most will be supplied by the distribution network from other generators within the network. Negative phase sequence measurements used for power island protection could be derived from existing generator negative phase sequence protection systems that are commonly used to protect the generator against prolonged system unbalance.

Aspects of the present invention overcome poor discrimination of ROCOF protection systems by measuring phase balance to determine whether a power island indicated by a change in frequency is due to isolation creating a power island or system wide frequency disturbance. It will be appreciated that it is only localised frequency changes due to power islands which should cause concern, whilst system wide frequency disturbances by implication will be emulated across the whole distribution network.

By aspects of the present invention, although there is deliberate disturbing of the electrical distribution network by using different combinations of phase pairs and test reactances appropriately distributed about the network, there is no overall system disturbance during normal operation of the distribution network. For example, it is known to provide switching capacitance and measuring the voltage changes produced and this will cause local phase unbalance discrimination assuming that the consequent voltage changes are much larger during island operation than when the distributor generator is synchronised with the whole power distribution network. However, although this method of switching capacitance and measuring the voltage changes may be acceptable, there is the distinct disadvantage that if a large number of protection systems were installed which employed this same approach, a significant capacitive reactive demand would be connected and disconnected over the whole distribution system with unclear consequences. Local phase unbalance discrimination in accordance with aspects of the present invention avoids such problems by assigning inductance to some phase pairs and test reactances instead of capacitance so that the overall inductance and capacitance factors generally cancel each other out.

As indicated, in accordance with aspects of the present invention, test reactances are connected between phases in preferred embodiments, but it will be appreciated instead phase to earth or phase to neutral connections for the test reactances could be provided. However, it will be understood in some poly-phase systems, and in particular high voltage three phase systems, the neutral is not always available and phase to earth connections are therefore not possible.

As indicated above, load transients may affect operation. In such circumstances in order to maintain voltage balance across the distribution network during system or network wide frequency transients it is essential that all test reactances are in service during frequency transients as measured by ROCOF generator protection relays using local phase unbalance discrimination in accordance with aspects of the present invention. In such circumstances test reactances must be connected through appropriate switching in time for the ROCOF generator protection system to use local phase unbalance discrimination with confidence that such discrimination has not been corrupted by the test reactance switching transients.

Appropriate test reactance switching is achieved by using ROCOF relays to connect the test reactances in time prior to ROCOF generator interrogation. These relays will have settings such that the test reactances are connected prior to the ROCOF generator switching relays to use local phase unbalanced discrimination. An example of such settings may be as follows:

In Britain, ROCOF is typically set to 0.1 Hz per second with a time delay of 0.6 seconds. Starting relays would require a more sensitive ROCOF setting with a shorter operating time, for example 0.08 Hz per second which is 20% lower than the typical ROCOF generator protection threshold. A time delay of 0.2 seconds would offer some immunity to the test reactance load transient but would allow a test reactance to be switched in time for the ROCOF protection to use local phase unbalance discrimination.

ROCOF starting relays will generally need a feature which allows disconnection of the test reactances once the system wide frequency transient has subsided. Typical settings would be in the order of 0.06 Hz per second, at least 20% of the pick up and a time setting of at least 3 seconds to avoid frequency switching in and out of the test reactances that would cause voltage fluctuations evident through flicker in such devices as incandescent lamps.

The generation arrangement in accordance with the present invention may utilise local phase unbalance discrimination to determine a variety of power island protection and detection scenarios and is not limited to use of ROCOF protection systems. Furthermore, in addition to use of active phase synchronisation measurements other means of measuring the phases, unbalance or balance may be used.

Although the embodiments of the invention described above relate to poly-phase electrical supply, it will be appreciated that aspects of the present invention could be applied to single phase generation. In such an approach, it will be appreciated that although a single phase capacitive test reactances and inductive test reactances would be provided across differing parts of the distribution network, but the inductive and capacitive test reactances cancel each other out substantially. Single phase generation would use test reactances connected between phase and earth instead of between phases.

As indicated above, generally test impedances in accordance with the present invention will be of a fixed value whether capacitive or inductive. However, where desirable test impedance presented across phases may be adaptive dependent upon requirements for balance throughout the distribution network. Some unbalances exist on a power distribution system during normal operation and the unbalance will vary according to various system conditions. In such circumstances means of connecting test impedances should offer a choice of phase pairs so that the control for the phase discriminator can choose between the phase pairs which would tend to reduce unbalance when the test impedance is connected during normal operation of the distribution network. In such circumstances, further adaptability could be provided with regard to the impedance, whether inductive or capacitive so that unbalance may be minimised further during normal operation of the distribution network.

It will be appreciated that aspects of the present invention are applicable to a range of generation scenarios where power island protection is necessary.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A generation system comprising a generator and a distribution path to a distribution network, the distribution path including a circuit breaker which may isolate the generator, the distribution network having at least one phase of electrical power passing through it in use and a phase discriminator having substantially a balanced load collectively over all phases of electrical power across the distribution network, the phase discriminator acting across phase pairs and including means whereby a test reactance is switched into the phase of the electrical power through the distribution network to identify phase unbalance in the distribution path through an unbalanced test reactance load in the distribution path in order to control the circuit breaker in terms of isolation of the generator from the distribution network.

2. A system as claimed in claim 1 wherein the generator provides poly-phase electrical power.

3. A system as claimed in claim 1 wherein the electrical power is three phase and has two test reactance types, inductive and capacitive.

4. A system as claimed in claim 1 wherein two or more phase pairs with inductive and capacitive test reactance will cancel each other across the distribution network to provide the balanced load.

5. A system as claimed claim 1 wherein the phase discriminator acts by switches to provide combinations of phase pairs with test reactance across the network and/or distribution path for the load balance.

6. A system as claimed in claim 5 wherein each switch may be altered to provide different combinations of phase pairs and/or test reactance.

7. A system as claimed in claim 1 wherein the phase discriminator is arranged from time to time to apply the test reactance to the phase pairs for a period of time.

8. A system as claimed in claim 1 wherein the phase discriminator includes a time delay to prevent determination of unbalance of the balance load across the phase discriminator due to simple switching of the phase pairs with test reactance by the phase discriminator.

9. A system as claimed in claim 1 wherein the test reactance is applied between different phases in the distribution network.

10. A system as claimed in claim 1 wherein the phase discriminator is combined with an ROCOF generator protection arrangement.

11. A system as claimed in claim 10 wherein the phase discriminator is arranged to apply the test reactance across phase pairs in advance of the ROCOF generator protection system.

12. A method of phase discrimination in a generation system comprising switching a test reactance across phase pairs of a distribution network such that the phase pairs and the test reactance are substantially balanced in terms of load across the whole distribution network but an un-balanced test reactance load in a particular distribution path to a generator of the generation system will identify phase unbalance due to islanding in a distribution path and control a circuit breaker in order to isolate the generator from the distribution network.

13. A method as claimed in claim 12 wherein the phase pairs and the test reactance in two or more phase pairs will be arranged to substantially cancel each other out in terms of load over the distribution network.

14. A method as claimed in claim 12 wherein the method incorporates switching combinations of phase pairs with respective test reactance across the network and/or distribution path to identify phase load un-balance.

15. A method as claimed in claim 14 wherein the switching may be altered to provide different combinations of phase pairs and/or test reactance.

16. A method as claimed in claim 12 wherein the method is arranged to periodically apply test reactance to the phase pairs over a period of time.

17. A method as claimed in claim 12 wherein the method incorporates a time delay to prevent determination of load unbalance during brief periods of un-balance following the switching of the test reactance across the phase pairs.

18. A method as claimed in claim 12 wherein the phase pairs and the test reactance in two or more phase pairs will be arranged to substantially cancel each other out over the distribution network.

19. A method as claimed in claim 12 wherein the method incorporates switching combinations of phase pairs with respective test reactances across the network and/or distribution path to identify phase load un-balance.

20. A method as claimed in claim 19 wherein the switching may be altered to provide different combinations of phase pairs and/or test reactance for determination of load un-balance.

21. A method as claimed in claim 12 wherein the method is arranged to periodically apply the test reactance across phase pairs over a period of time.

22. A method as claimed in claim 12 wherein the method incorporates a time delay to prevent determination of load un-balance during brief periods following the switching on or off of the test reactances across the phase pairs.

23. A generation system operated in accordance with the method as claimed in claim 12.

\* \* \* \* \*